United States Patent [19]

Gessell et al.

[11] 4,341,891

[45] Jul. 27, 1982

[54] METHOD FOR REDUCING GELS IN POLYOLEFIN

[75] Inventors: Donald E. Gessell; David M. Courter, both of Baton Rouge, La.

[73] Assignee: The Dow Chemical Company, Midland, Mich.

[21] Appl. No.: 221,090

[22] Filed: Dec. 29, 1980

[51] Int. Cl.³ ............................. C08F 6/00; C08F 8/04
[52] U.S. Cl. ..................................... 528/483; 525/338; 525/339; 526/67; 526/68
[58] Field of Search .................. 528/483; 525/338, 339

[56] References Cited

U.S. PATENT DOCUMENTS

| Re. 30,148 | 11/1979 | Jezl | 526/65 |
|---|---|---|---|
| 3,624,184 | 11/1971 | Cox | 526/905 X |
| 3,784,539 | 1/1974 | Ort | 526/905 X |
| 3,951,933 | 4/1976 | Nasser, Jr. | 525/338 |
| 4,065,609 | 12/1977 | Willmore | 526/61 |
| 4,211,863 | 7/1980 | McDaniel | 528/483 |

FOREIGN PATENT DOCUMENTS

| 615116 | 2/1961 | Canada | 525/338 |
|---|---|---|---|
| 891786 | 3/1962 | United Kingdom | 525/338 |

OTHER PUBLICATIONS

SRI International High Density Polyethylene, Supp. C, Chadwick, J. L. et al., Mar. 1979, pp. 109–141, 293.

*Primary Examiner*—C. A. Henderson
*Attorney, Agent, or Firm*—J. G. Carter

[57] ABSTRACT

An improved process for polymerizing olefins in the presence of a catalyst employing hydrogen for molecular weight control is disclosed wherein the improvement resides in adding additional hydrogen to the polymer slurry produced in the reactor system so as to eliminate or reduce the formation of gels in articles fabricated from the resultant polymer.

5 Claims, No Drawings

METHOD FOR REDUCING GELS IN POLYOLEFIN

BACKGROUND OF THE INVENTION

The present invention pertains to a process for preparing polymers from one or more α-olefins or mixtures thereof with other polymerizable ethylenically unsaturated monomers.

Most slurry processes for preparing α-olefin polymers usually produce a reactor effluent containing polymer, diluent, catalyst and unreacted monomer or monomers. Conditions usually exist such that polymerization of the monomer or monomers continues after the reactor system. However, a post reactor formed polymer is usually produced which results in a heterogeneous polymer composition having the disadvantage, when the resultant polymer is employed in film and blow molding applications, of providing articles having gel particles randomly present therein which both weaken and cause a displeasing appearance in the articles.

Processes have been proposed to eliminate the formation of the heterogeneous polymer by employing various catalyst poisons or deactivation agents.

The present invention solves this problem by adding hydrogen to the effluent from a reactor system employing one or more reactors in a quantity sufficient to eliminate or reduce the formation of gels in articles fabricated from the resultant polymer. This method permits the recycle of any unpolymerized polymerizable monomers since no catalyst poison is employed.

SUMMARY OF THE INVENTION

The present invention pertains to an improvement in a process for the manufacture of polymers by polymerizing at least one α-olefin in the presence of a catalyst and hydrogen as a molecular weight control agent under slurry conditions in a reactor system containing one or more reactors, wherein the improvement resides in adding hydrogen to the effluent from said reactor system in a quantity so as to eliminate or reduce the formation of gels formed in articles fabricated from the resultant polymers.

As used herein, the term "gel" is defined as a heterogeneous area in fabricated polyolefins, associated with discontinuities in the average molecular weight of the polyolefin. More specifically, gels are associated with a portion of the polymer having a very high molecular weight relative to the overall molecular weight of the polymer.

DESCRIPTION OF THE PREFERRED EMBODIMENTS

Olefins which are suitably polymerized or copolymerized in the practice of this invention are generally the aliphatic α-monolefins having from 2 to 18 carbon atoms. Illustratively, such α-olefins include ethylene, propylene, butene-1, pentene-1, 4-methylpentene-1, 3-methylbutene-1, hexene-1, octene-1, dodecene-1, octadecene-1, hexadiene-1,5, octadiene-1,7, mixtures thereof and the like. It is understood that the α-olefins may be copolymerized with other α-olefins and/or with other ethylenically unsaturated monomers such as butadiene, isoprene, pentadiene-1,3, styrene, α-methylstyrene, and similar ethylenically unsaturated monomers which do not destroy conventional Ziegler catalysts. Most benefits are realized in the polymerization of aliphatic α-monoolefins particularly ethylene and mixtures of ethylene and quantities which provide up to about 50, especially from about 0.1 to about 40, weight percent of propylene, butene-1, hexene-1, octene-1 or similar higher α-olefin, or mixtures thereof, based on total monomer in the resultant polymer.

Suitable inert organic diluents which can be employed in the polymerization process as a reaction medium include, for example, liquefied ethane, propane, isobutane, n-butane, n-hexane, the various isomeric hexanes, isooctane, paraffinic mixtures of alkanes having from 4 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about −50° to about 200° C. Also included as suitable inert diluents are benzene, toluene, ethylbenzene, cumene, decalin and the like.

Suitable catalysts which can be employed in the process include, for example, titanium tetrachloride, titanium trichloride, vanadium trichloride, $TiCl_3.1/3AlCl_3$ or other Ziegler-Natta catalysts such as described in the book *ZIEGLER-NATTA CATALYSTS AND POLYMERIZATION* by J. Boor, Jr., Academic Press, Inc., 1979, which is incorporated herein by reference. Also suitable are polymerization catalysts in which a transition metal compound is reacted with or supported on a support such as, for example, magnesium chloride, magnesium oxide, silica or alumina as described in the aforementioned book by J. Boor, Jr., pp 160–165.

The terms "Ziegler Catalysts", "Ziegler Type Catalysts", "Ziegler-Natta Catalysts" and "Ziegler-Natta Type Catalysts" as employed herein are interchangeable expressions for catalysts containing a transition metal compound and as a cocatalyst a suitable organometallic compound. Usually, a titanium chloride is employed as a transition metal compound and an aluminum alkyl is employed as an organometallic compound.

The above catalysts are employed in the presence of, as a co-catalyst, an organometallic compound which is a halide, hydride or totally alkylated derivative of the metals of Groups 1a, 2a, 2b, 3a or 4a of the Periodic Table such as, for example, triisobutyl aluminum, triethyl aluminum, diethylaluminum chloride, ethylmagnesium chloride, diisobutylaluminum hydride, dibutyl magnesium, mixtures thereof and the like.

In the process employing the present invention, polymerization is effected by adding a catalytic amount of the catalyst composition to a polymerization zone containing α-olefin monomer, or vice versa. The polymerization is maintained at slurry polymerization temperatures, usually in the range of from about 0° to about 95° C. for a residence time of from about 10 minutes to several hours, preferably from about 15 minutes to about 8 hours. It is generally desirable to carry out the polymerization in the absence of moisture and oxygen. In the polymerization process, a carrier which may be an inert organic diluent or solvent or excess monomer is generally employed.

The polymerization pressures usually employed are relatively low, e.g., from about 40 to about 500 psig. However, polymerization can occur at pressures from atmospheric up to a pressure determined by the capabilities of the polymerization equipment. During polymerization it is very desirable to stir the polymerization recipe to obtain better temperature control, to maintain uniform polymerization mixtures throughout the polymerization zone, and to insure contact between the olefin and the catalyst.

Hydrogen is employed to control molecular weight of the resultant polymer. It is beneficial to employ hydrogen in a concentration ranging from about 0.1 to about 80 mole percent, on a solvent-free basis, in the gas or liquid phase in the polymerization vessel(s). The large amounts of hydrogen within this range are found to produce generally lower molecular weight polymers. Hydrogen can be added with a monomer stream to the polymerization vessel or separately added to the vessel before, during or after addition of the monomer to the polymerization vessel, but during or before the addition of the catalyst.

In the present invention, the vapor from a vessel following the reactor system containing unreacted monomer(s) and hydrogen can be recycled to the reactor system without purification or treatment to alter its composition.

The following examples are illustrative of the present invention, but are not to be construed as to limiting the scope thereof in any manner.

COMPARATIVE EXPERIMENT

Ethylene and 1-butene were co-polymerized in a dual reactor system with a magnesium salt supported titanium-containing catalyst employing an aluminum alkyl as a cocatalyst, using hexane as a reaction medium. The product stream was fed to a vessel following the reactor system where it was held for about one hour under a pressure of about 100 psig (7.03 kg/cm$^2$) at a temperature of about 75° C. From said vessel, the product stream was passed through a reaction medium-removal system wherein the solid polyolefin product was separated from the hexane. The polyolefin was pelletized, and the pellets were fabricated into eighty-gram bottles, using a one-half gallon milk-jug design mold on a Uniloy Blowmolder (Hoover Universal, Manchester, Mich., Model No. 2016) with a two and one-half inch diameter die. The bottles were inspected visually, and were found to include a average of six gels per bottle.

EXAMPLE OF THE INVENTION

As in the Comparative Experiment, the same product was fed to a vessel following the reactor system. Sufficient hydrogen was added to said vessel to provide a concentration of sixty-one mole percent hydrogen in the vapor phase. The product stream was then held in said vessel for about one hour under a pressure of about 100 psig (7.03 kg/cm$^2$) at a temperature of about 75° C. From said vessel, the product stream was passed through the reaction medium removal system. The separated polyolefin product was pelletized, and the pellets were fabricated into eighty-gram bottles, following the procedure described in the Comparative Experiment. The bottles were inspected visually, and were found to include an average of 0.6 gels per bottle.

While certain representation embodiments and details have been shown for the purpose of illustrating the present invention, it will be apparent to those skilled in the art that various changes and modifications can be made therein without departing from the spirit and scope of the invention.

We claim:

1. A method for decreasing gel formation in articles fabricated from polymers prepared by polymerizing at least one α-olefin, said method consisting essentially of the steps of:
    (a) polymerizing said at least one α-olefin in a reaction system under slurry conditions and in the presence of a Ziegler-Natta catalyst thereby forming a polymer of said at least one α-olefin, said polymer being characterized as having a molecular weight that is controlled by conducting said polymerization in the presence of a predetermined quantity of hydrogen; and
    (b) contacting said polymer formed in step (a), after it has been removed from said reaction system, with an additional quantity of hydrogen without introducing additional quantities of α-olefin, thereby terminating continuing post-reaction system polymerization of higher molecular weight polymer thereby decreasing the formation of gels in articles fabricated from the polymer.

2. The method of claim 1 wherein a plurality of reactors or reaction zones are employed as the reactor system, said catalyst is of the Ziegler-Natta type and the added hydrogen is provided in a vessel between the reactor system and a system for recovery of the reaction medium.

3. The method of claims 1 or 2 wherein ethylene or a mixture of ethylene and at least one higher α-olefin having from 3 to about 10 carbon atoms is polymerized and said Ziegler-Natta catalyst is a supported titanium-containing catalyst employing an aluminum alkyl compound as the co-catalyst.

4. The method of claim 3 wherein said higher α-olefin contains from about 4 to about 8 carbon atoms.

5. The method of claim 3 wherein said higher α-olefin is at least one of butene-1, hexene-1 or octene-1.

* * * * *